United States Patent [19]
Davidson

[11] Patent Number: 4,838,458
[45] Date of Patent: Jun. 13, 1989

[54] ADJUSTABLE VALVING ROD

[75] Inventor: C. Marshall Davidson, Hamden, Conn.

[73] Assignee: Olin Corporation, Cheshire, Conn.

[21] Appl. No.: 159,611

[22] Filed: Feb. 23, 1988

[51] Int. Cl.⁴ .............................................. B67D 5/60
[52] U.S. Cl. .................................... 222/135; 222/149; 239/414
[58] Field of Search ................ 222/135, 145, 148–149, 222/334, 504; 239/114–118, 123, 411, 414

[56] References Cited

U.S. PATENT DOCUMENTS

| | | | |
|---|---|---|---|
| 1,960,724 | 5/1934 | Bramsen | 239/411 |
| 3,366,337 | 1/1968 | Brooks et al. | 239/414 |
| 3,799,403 | 3/1974 | Probst et al. | 222/135 |
| 4,351,354 | 9/1982 | Hilterhaus et al. | 137/240 |
| 4,422,574 | 12/1983 | Mancuso, Jr. | 239/118 |
| 4,471,887 | 9/1984 | Decker | 222/135 |
| 4,568,003 | 2/1986 | Sperry et al. | 222/145 |

Primary Examiner—Michael S. Huppert
Attorney, Agent, or Firm—Ralph D'Alessandro

[57] ABSTRACT

In a plural component foam dispensing apparatus there is provided an adjustable valving rod which permits the length of the rod to be more accurately adjusted to compensate for varying tolerances and permit the rod to extend out the end of the mixing chamber in its extended position and to retract to the rear of the inlet orifices in its retracted position.

26 Claims, 2 Drawing Sheets

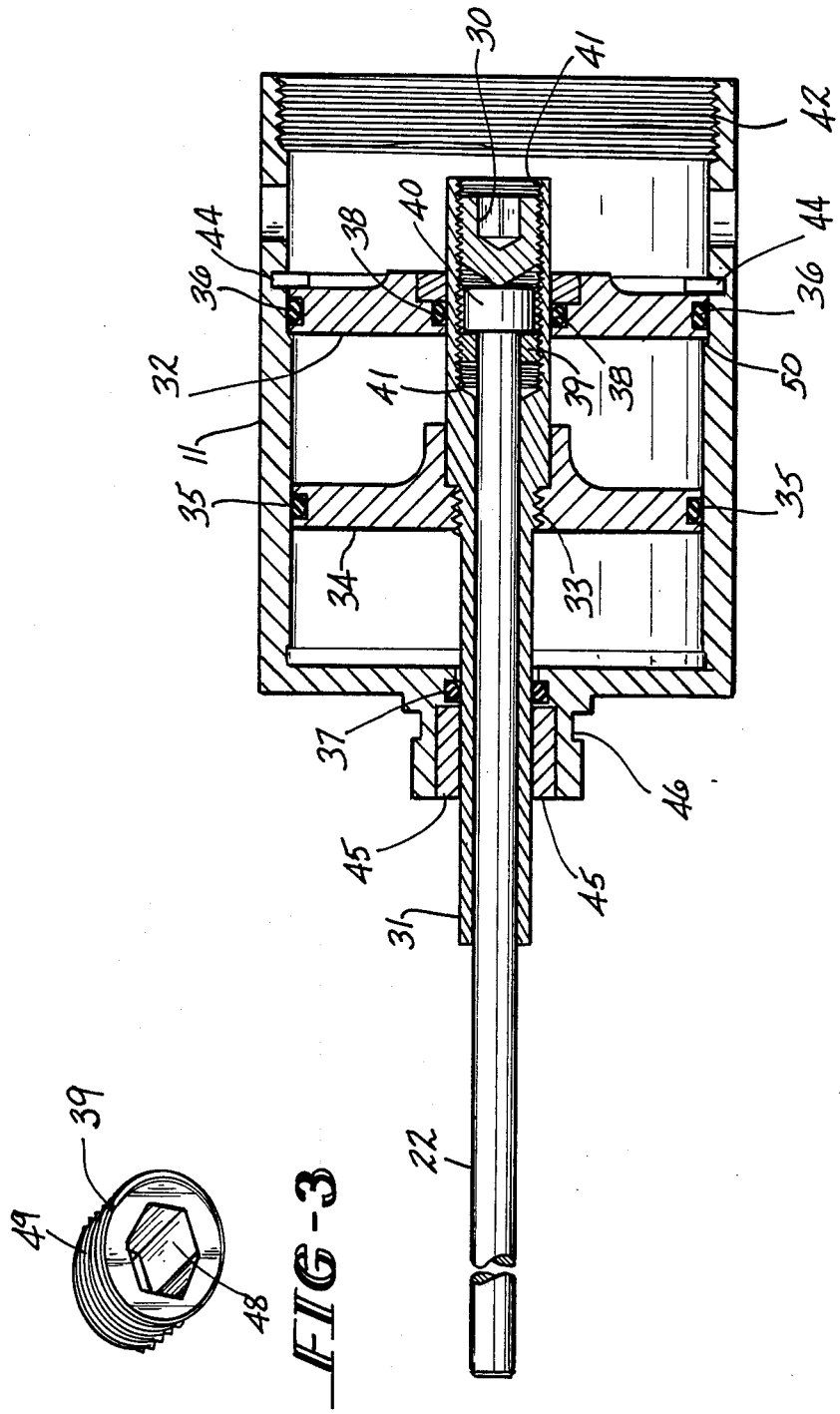

ADJUSTABLE VALVING ROD

BACKGROUND OF THE INVENTION

The present invention relates generally to apparatus used to dispense a plurality of liquids through a single orifice and, more particularly, to the valving rod that is used to control the flow of the plural liquid components into the mixing chamber via the infeed ports.

Polyurethane foams are formed by the reaction of an isocyanate component and hydroxyl-bearing compounds. When mixed in the presence of a catalyst and other additives, such as a polyether resin, a surfactant, a catalyst, and a blowing agent, these chemicals react to form cross-linked polymer chains, more commonly known as a polyurethane. Each of these components of the plural component material, by itself, is generally stable. Thus, each component will not cure or cross-link for extended periods of time, often as long as several months, if they are properly stored. However, when the isocyanate component and the chemical polyol component, a preformulated compound formed from the aforementioned resin, surfactant, catalyst and blowing agent, are mixed together in proper concentrations, an exothermic chemical reaction of the isocyanate and polyol occurs. This reaction causes a continued expansion that is evidence of the polymerization and manifests itself as foam which cross-links and cures. The cross-linking and curing usually is substantially completed in a matter of seconds.

Polyurethane foam dispensers are well known and have achieved a high degree of usage in factories where components must be adhesively lined with an insulating foam or where products must be packaged and protected from damage during shipment. This high level of use of polyurethane foam dispensing equipment has also focused attention on the efficiency of prior apparatus employed to accomplish this dispensing. Many of the problems with foam dispensing equipment stem from the fact that the polyurethane foam "sets" or builds up in the dispenser, normally within the mixing chamber or the nozzle, after the chemical components have cross-linked and begun to cure. This "setting" can eventually cause the apparatus to become inoperative due to clogging or blockage of the flow passages.

In operations such as those required during packaging, where intermittent use of the dispensing apparatus is required, the "setting" problem is more severe. This typically occurs in the situation where a packer initially directs a "shot" of the mixed plural components into the bottom of a container, inserts a polyethylene strip over the top, and places the product to be shipped in the container. Another sheet of polyethylene is placed on top of the product, and the foam dispensing apparatus is then activated after a delay of 10 to 20 seconds from the time the first "shot" was dispensed to fill the box with the cushioning foam. This procedure is repeated for each item to be packed.

Prior dispensing equipment have attempted to solve this "setting" problem by using either separately or combinatively air blasts, cleaning rods or plungers with scrapers, or solvent to remove the residue foam from the dispensing assembly. Specific polyurethane foam systems have attempted to use air with pressurized solvent blown into the mixing chamber and the dispensing nozzle, and automatic solvent flush that runs through the mixing chamber and dispensing nozzle, a blast of purging gas preceding the continuous pumping of solvent through the mixing chamber and dispensing nozzle, and reciprocating cleaning rods or plungers which may or may not use the solvent to faciliate the scraping for residue foam from the dispensing apparatus.

The use of a combination cleaning rod and valving rod to control the flow of the polyol and isocyanate components has proven to be the most common design employed in commercial applications. To be successful, however, the length of the valving rod must be within closely controlled tolerances so that in its extended position the rod extends out the end of the mixing chamber to thoroughly clean any of the residue foam from the end and, in its retracted position, it retracts to the rear of the inlet orifices that supply the isocyantae and polyol components. A valving rod that is too short will not remove all of the foam from the end of the mixing chamber and clogging will eventually occur. A valving rod that is too long will not permit the inlet orifices to be uncovered in the retracted position to have the isocyanate and polyol components enter the mixing chamber with unrestricted flow, or at all. Additionally, a valving rod that is too long permits the foam to adhere to the end of the rod and then will score the inner plastic portions of the mixing chamber upon retraction.

With the advent of removable mixing chambers and dispensing nozzles, disassembly of the dispensing apparatus to include removal of the valving rod is a normal part of the maintenance operation. The need to be able to remove the valving rod easily and replace it easily with the same length as prior to disassembly has taken on increased importance.

These problems are solved in the design of the present invention by providing an adjustably positionable valving rod to ensure the proper rod length is obtained and to permit the rod to be easily removed from a plural component dispensing assembly.

SUMMARY OF THE INVENTION

It is an object of the present invention to provide an adjustably positionable valving rod for a plural component dispensing assembly that compensates for manufacturing tolerances.

It is another object of the present invention to provide an adjustably positionable valving rod for a plural component dispensing assembly that is easily removable upon disassembly and easily replaceable upon reassembly.

It is a feature of the present invention that the adjustably positionable valving rod may be removed from the plural component dispensing assembly for cleaning and replaced in such a manner that it ensures its length is unchanged.

It is another feature of the present invention that the adjustably positionable valving rod is secured within the cylinder of the plural component dispensing apparatus by means of adjustable threaded screws.

It is an advantage of the present invention that the valving rod is easily removable and replaceable such that the rod is returned to the same position as prior to disassembly.

It is another advantage of the present invention that its easier removal and replacement facilitates cleaning of the plural component dispensing apparatus.

It is still another advantage of the present invention that it is lower in cost and permits easy replacement of defective valving rods.

These and other objects, features and advantages are obtained in a plural component dispensing apparatus employing an adjustably positionable valving rod which utilizes adjustment means within the cylinder of the dispensing apparatus to control the length of the valving rod.

BRIEF DESCRIPTION OF THE DRAWINGS

The objects, features and advantages of the present invention will become apparent upon consideration of the following detailed disclosure of the invention, especially when taken in conjuction with the accompanying drawings wherein:

FIG. 2 is a sectional view of the cylinder of the plural component dispensing apparatus showing the valving rod adjustably secured therein; and FIG. 3 is a perspective view of the hollow lock screw used to adjust the position of the valving rod.

DETAILED DESCRIPTION OF THE PREFERREDY EMBODIMENT

Figure 1:
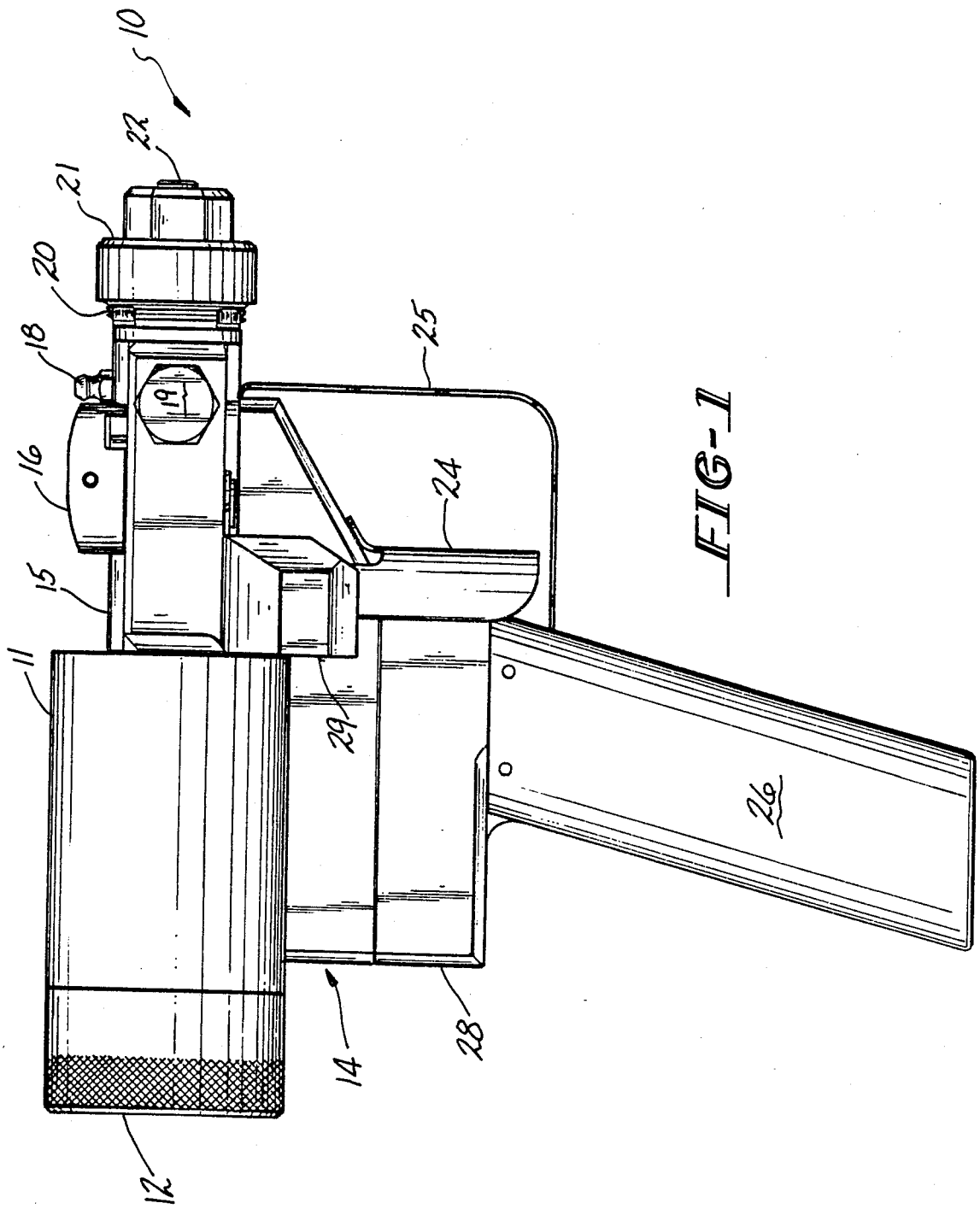
FIG. 1 is a side elevational view of the plural component dispensing apparatus showing the valving rod extending from the tip of the mixing chamber.

FIG. 1 shows a side elevational view of the plural component dispensing assembly, indicated generally by the numeral 10. Assembly 10 consists of a cylinder 11, a cylinder end closure cap 12, an upper gun portion 14, a valve block 15, a handle base 28 and a grip handle 26. Grip handle 26 has a trigger 24, which may be an electric trigger or an air spool type of trigger switch to activate the internal mechanisms within the cylinder 11 to permit the flow of the plural components. The grip handle 26 may have side covers attached thereto and is appropriately secured to the handle base 28, such as with bolts or mechanically interlocking parts. A trigger guard 25 connects to the grip handle 26 and the valve block 15.

The upper gun portion 14 has the aforementioned cylinder 11 threaded into the valve block 15. The polyol component fitting 29 feeds polyol from a polyol fluid hose (not shown) into the valve block 15 to supply one of the plural components to the assembly 10. The polyol component passes from the fitting 29 through flow passages in the valve block 15 into the nozzle and mixing chamber both of which are not shown. A shut-off valve 16 is used in the polyol component feed path to permit a continuous flow of polyol component through the mixing chamber or to shut-off the flow by turning the shut-off valve 16 to seal off the flow of components. Comparable structures exist on the opposite side of the assembly 10 for the isocyanate fluid component.

The nozzle (not shown) seats against the front portion of the valve block 15 and extends forwardly out through the nozzle retaining cap 21 until it is flush with or extends slightly beyond the circular end opening in the retaining cap 21. The nozzle retaining cap 21 is screwed in place onto the threads 20 at the front of the valve block 15 to retain the nozzle in position with the nozzle protruding through the circular opening in the center of the nozzle retaining cap 21.

When the shut-off valves 16 are in the flow or open position, the plural components flow on each side of the valve block 15 in their respective internal passages through a filter screen (not shown) which sits within an appropriate filter screen opening (also not shown) beneath the filter plug caps 19 (only one of which is shown). These filter screens are retained in place by the partially hollow filter plug caps 19, which are threadingly engaged within the filter plug cap recesses. An O-ring seal can be utilized to prevent leakage. Similar O-ring seals can be used within the internal fluid passages (not shown) within the valve block 15 to prevent leakage as the plural components flow into inlet orifices (not shown) within the nozzle and into the mixing chamber (also not shown) which is within the elongated central bore of the nozzle.

A grease fitting 18 is provided to permit lubrication of the internal moving parts within the assembly 10.

The cylinder 11 has a piston assembly that is shown generally in FIG. 2. The piston assembly is pneumatically driven and includes the piston rod 31, rear cap 32 and piston 34. Piston rod 31 has an internally threaded cavity 41 on the opposing end to the rod tip which is accessible through the rear of the cylinder 11. The valving rod 22 extends its tip out through the front of the nozzle and the nozzle retaing cap 21, as seen briefly in FIG. 1. Valving rod 22 fits within the piston rod 31 by being inserted through the internally threaded cavity 41 from the rear of the cylinder 11 once the cylinder end closure cap 12 of FIG. 1 is removed. A hollow socket jam screw 39 is threaded into the internally threaded cavity 41 prior to the insertion of the valving rod 22.

Piston rod 31 passes through piston rear cap 32. Rod 31 is sealingly movable through the rear cap 32 with the assistance of O-ring 38. Piston rear cap 32 is stopped in its rearward movement within the cylinder 11 by the lock ring 44 that seats within an internal groove within the piston 11. Cylinder rear cap 32 is prevented from moving forward by shoulder 50 machined into the interior of cylinder 11. Piston 34 is threaded onto the piston rod threads 33.

O-rings 35 and 36 prevent the leakage of air around the inner diameter of the cylinder 11. Similarly, O-rings 37 provide a tight seal of the piston rod 31 within the cylinder 11. Bushing 45 is used to seat piston rod 31 within the front portion of the cylinder 11. O-rings (not shown) can be utilized in O-ring receptacles 46 to securely seat the front of cylinder 11 into the rear of the valve block 15.

Once assembled, the valving rod 22 extends through the cylinder 11, the valve block 15, the nozzle and the nozzle retaining cap 21 to extend its tip out of the front of the assembly 10 as seen in FIG. 1. The valving rod 22 is reciprocably movable within the valving rod passage within the valve block and the bore within the nozzle between a first position that extends forwardly of the nozzle inlet orifices or ports (not shown) in the nozzle through which are fed the polyol and isocyanate components and a second position rearwardly of the nozzle inlet orifices or ports. When the valving rod 22 extends forwardly of these nozzle inlet ports it shuts off the flow of the plural components into the mixing chamber of the nozzle where impingement mixing occurs. In the second position to the rear of the nozzle inlet ports, the valving rod permits the flow of these plural components into the bore in the mixing chamber of the nozzle. However, in order to ensure that flow of plural components is at the proper level, it is essential that the valving rod 22 be precisely positioned to ensure the proper length of the rod required extends out the front of the assembly 10.

To ensure that this length is proper, adjustment means are provided within the rear of the piston rod 31. The adjustment means include the internally threaded cavity 41, the hollow socket jam screw 39, the valving rod head 40, and the socket pointed set screw 30. The hollow socket jam screw 39 is threaded within the internally threaded cavity 41 until the valving rod 22 extends the desired length through the valve block 15 and the nozzle and nozzle retaining cap 12. Once set at the proper position, the socket pointed set screw 30 is inserted into the internally threaded piston rod cavity 41 and tightened until it seats against the head 40 of the valving rod. This secures the valving rod at the proper position. It can be seen from FIG. 2 how the position of the valving rod head 40 can be adjusted laterally by the positioning of the hollow socket jam screw 39 and the socket pointed set screw 30. Once thus properly positioned, the cylinder end closure cap 12 is threaded into the clyinder threads 42 to close the cover over the portion of the cylinder 11.

The hollow socket jam screw 39 is shown in greater detail FIG. 3. It can be seen that the threads 49 are positioned to mate with the internally threaded cavity 41, while the socket orifices 48 extends through the screw to receive a hexagonally-shaped wrench or another appropriate tool to locate the jam screw 39 as a stop against which valving rod head 40 seats.

Adjustment to the valving rod 22 may be necessary, such as with replacement of a new valving rod or during the course of regular periodic maintenance when the valving rod 22 and the cylinder 11 are disassembled. To accomplish this the cylinder end closure cap 12 is removed from the cylinder 11 at the rear of the assembly 10. The socket pointed set screw 30 is removed from the piston rod internally threaded cavity 41 and the valving rod 22 is removed rearwardly from the assembly 10 through the piston rod 31 and cylinder 11. A new valving rod 22 can be inserted from the rear. Should the length of the replacement valving rod 22 be different from the original or adjustment of its length be necessary, the hollow socket jam screw 39 is adjusted by using a hexagonally-shaped wrench or other appropriate tool to move the hollow socket jam screw 39 forwardly or rearwardly, as required, within the internally threaded cavity 41. Once properly positioned, the valving rod 22 is replaced through the rear of the internally threaded cavity 41 and the socket pointed set screw 30 is tightened and positioned against the head 40. The cylinder end closure cap 12 is then replaced over the cylinder. The assembly 10 is then ready for use.

While the preferred structure in which the principles of the present invention have been incorporated is shown and described above, it is to be understood that the invention is not to be limited to the particular details thus present, but in fact, widely different means and structure may be employed in the practice of the broader aspects of this invention. For example, the instant invention may equally well be empolyed in a hand held or a machine mounted plural component dispensing head. In the case of the latter, the handle 26 would be removed.

Having thus described the invention, what is claimed is:

1. A plural component dispensing apparatus for dispensing from a front end of the apparatus a foam formed from the impingement mixing of plural components, the dispensing apparatus having an opposing rear end, comprising in combination:
   (a) a valve block with a hollow valving rod passage positioned therein and flow port means for the fluid flow of the plural components therethrough, the valve block further having a first end adjacent the front end of the apparatus and an opposing second end nearer the opposing rear end of the apparatus than the front end;
   (b) a nozzle having an elongate bore extending therethrough aligned with the valving rod passage and seated against the first end of the valve block, the nozzle having a first end adjacent the first end of the valve block and an opposing second end;
   (c) at least two plural component nozzle inlet ports connected to the flow port means and extending through the nozzle into the elongate bore, the nozzle inlet ports conveying the plural components from the flow port means into the bore;
   (d) a valving rod reciprocably movable within the valving rod passage and the bore between a first position extending forwardly of the nozzle inlet ports to shut-off the flow of plural components and a second position rearwardly of the nozzle inlelt ports to permit the flow of plural components into the bore;
   (e) cylinder means connectable to the opposing second end of the valve block to reciprocatingly actuate the valving rod;
   (f) valving rod position adjustment means within the cylinder means and cooperative with the cylinder means and the valving rod to control the positioning of the valving rod within the cylinder means so the valving rod selectively can be adjusted in a more extended position or a more retracted position in the bore and the valving rod passage to extend a greater or lesser distance beyond the opposing second end of the nozzle during reciprocal operating movement;
   (g) a mixing chamber within the bore of the nozzle defined by the second position of the valving rod and the opening of the nozzle inlet ports into the bore for the impingement mixing of the plural components;
   (h) plural component supply means to supply at least two plural components to the valve block and the flow port means; and
   (i) nozzle retaining means removably connectable to the front end of the apparatus to surround and retain the nozzle.

2. The apparatus according to claim 1 wherein the valving rod position adjustment means is cooperative with piston rod means within the cylinder means.

3. The apparatus according to claim 2 wherein the piston rod means further includes a hollow piston rod cavity.

4. The apparatus according to claim 3 wherein the valving rod position adjustment means further includes a head on the valving rod within the hollow piston rod cavity, the head being movably adjustable within the hollow piston rod cavity to extend or retract the position of the valving rod in the bore and the valving rod passage.

5. The apparatus according to claim 4 wherein the head of the valving rod within the hollow piston rod cavity is securable in a fixed position by adjustable locking means.

6. The apparatus according to claim 5 wherein the adjustable locking means is a set screw adjacent the head of the valving rod that is positionable by means of internal threads in the hollow piston rod cavity, the set screw being adjacent the opposing rear end of the dispensing apparatus.

7. The apparatus according to claim 6 wherein the adjustable locking means includes a hollow jam screw positionable by means of the internal threads of the hollow piston rod cavity adjacent the head of the valving rod.

8. The apparatus according to claim 7 wherein the hollow jam screw is forward of the head of the valving rod and the set screw is rearward of the head of the valving rod.

9. The apparatus according to claim 2 wherein the valving rod position adjustment means is accessible through the opposing rear end of the dispensing apparatus.

10. The apparatus according to claim 9 wherein the valving rod position adjustment means is accessible by removing the end closure cap of the cylinder means. the cylinder means has a removable end closure cap and 11. The apparatus according to claim 10 wherein the valving rod is adjustable via the valving rod position adjustment means to extend through the elongate bore in the nozzle and out the front end of the dispensing apparatus.

12. In a plural component dispensing apparatus having a valve block with a hollow valving rod passage and a mixing chamber with an elongate bore corresponding to an in alignment with the valving rod passage, cylinder means, a valving rod reciprocably movable within the valving rod passage and the bore by the cylinder means to control the feed of the plural components into the mixing chamber and to help clean the bore, the improvement comprising:

valving rod position adjustment means within the cylinder means and cooperative with the cylinder means and the valving rod to control the positioning of the valving rod so the valving rod selectively can be adjustment in a more extended or a more retracted position in the bore and the valving rod passage to extend a greater or lesser distance beyond the mixing chamber during reciprocal operating.

13. The apparatus according to claim 12 wherein the cylinder means further includes a piston rod with a hollow piston rod cavity within which the valving rod is seated and a piston rear cap.

14. The apparatus according to claim 13 wherein the valving rod is adjustment within the hollow piston rod cavity and securable in position therein by adjustable locking means.

15. The apparatus according to claim 14 wherein the adjustable locking means is a set screw that is positionable by means of internal threads in the hollow piston rod cavity.

16. The apparatus according to claim 15 wherein the valving rod position adjustment means is accessible through the cylinder means.

17. A plural component dispensing apparatus for dispensing from a front end of the apparatus a foam formed from the impingement mixing of plural components, the dispensing apparatus having an opposing rear end, comprising in combination:

(a) a valve block with a hollow valving rod passage positioned therein and flow port means for the fluid flow of the plural components therethrough, the valve block further having a first end adjacent the front end of the apparatus and an opposing second end nearer the opposing rear end of the apparatus than the front end;

(b) a nozzle having an elongate bore extending therethrough aligned with the valving rod passage and seated against the first end of the valve block, the nozzle having a first end adjacent the first end of the valve block and an opposing second end;

(c) at least two plural component nozzle inlet ports connected to the flow port means and extending through the nozzle into the elongate bore, the nozzle inlet ports conveying the plural components from the flow port means into the bore;

(d) a valving rod reciprocably movable within the valving rod passage and the bore between a first position extending forwardly of the nozzle inlet port to shut-off the flow of plural components and a second position rearwardly of the nozzle inlet ports to permit the flow of plural components into the bore, the valving rod further including a head on the valving rod which is securable in a fixed position by adjustable locking means that include set screw adjacent the opposing rear end of the dispending apparatus and the head;

(e) cylinder means connectable to the opposing second end of the valve block to reciprocatingly actuate the valving rod;

(f) piston rod means within the cylinder means and including a hollow piston rod cavity with internal threads;

(g) valving rod position adjustment means including the valving rod and the piston means within the cylinder means and cooperative with the cylinder means to control the positioning of the valving rod within the cylinder means so the valving rod selectively can be extended or retracted through the bore and the valving the rod passage by adjustment of the valving rod head and the set screw in the internal threads to extend the valving rod a greater or lesser distance beyond the opposing second end of the nozzle;

(h) a mixing chamber within the bore of the nozzle defined by the second position of the valving rod and the opening of the nozzle inlet ports into the bore for the impingement mixing of the plural components;

(i) plural component supply means to supply at least two plural components to the valve block and the flow port means; and (j) nozzle retaining means removably connectable to the front end of the apparatus to surround and retain the nozzle.

18. The apparatus according to claim 17 wherein the adjustable locking means further includes a hollow jam screw positionable by means of the internal threads of the hollow piston rod cavity adjacent the head of the valving rod.

19. The apparatus according to claim 18 wherein the hollow jam screw is forward of the head of the valving rod and the set screw is rearward of the head of the valving rod.

20. The apparatus according to claim 19 wherein the valving rod position adjustment means is accessible through the opposing rear end of the dispensing apparatus.

21. The apparatus according to claim 20 wherein the cylinder means has a removable end closure cap and the valving rod position adjustment means is accessible by removing the end closure cap of the cylinder means.

22. The apparatus according to claim 21 wherein the valving rod is adjustable via the valving rod position adjustment means to extend through the elongate bore in the nozzle and out the front end of the dispensing apparatus.

23. In a plural component dispensing apparatus having a valve block with a hollow valving rod passage and a mixing chamber with an elongate bore corresponding to and in alignment with the valving rod passage, cylinder means, a valving rod reciprocably movable within the valving rod passage and the bore by the cylinder means to control the feed of the plural components to the mixing chamber, the improvement comprising in combination:

(a) valving rod position adjustment means within the cylinder means and cooperative therewith to control the positioning of the valving rod so the valving rod selectively can be extended or retracted through the bore and the valving rod passage to extend a greater or lesser distance beyond the mixing chamber; and (b) valving rod maintining means including a piston rear cap and a piston rod with a hollow piston rod cavity within which the valving rod is seated.

24. The apparatus according to claim 23 wherein the valving rod is adjustable within the hollow piston rod cavity and securable in position therein by adjustable locking means.

25. The apparatus according to claim 24 wherein the adjustment locking means is a set screw that is positionable by means of internal threads in the hollow piston rod cavity.

26. The apparatus according to claim 25 wherein the valving rod position adjustment means is accessible through the cylinder means.

* * * * *

UNITED STATES PATENT AND TRADEMARK OFFICE
CERTIFICATE OF CORRECTION

PATENT NO. : 4,838,458

DATED : June 13, 1989

INVENTOR(S) : C. Marshall Davidson

It is certified that error appears in the above—identified patent and that said Letters Patent is hereby corrected as shown below:

In column 7 at line 14 after "wherein" and before "the" insert --the cylinder means has a removable end closure cap and--; at lines 16-17 delete "the cylinder means has a removable end closure cap and"; and at line 47 delete "adjustment" and insert --adjustable--;

In column 8 at line 14 delete "port" and insert --ports--; at line 20 before "set" insert --a--; and at line 34 after "valving" and before "rod" delete "the"; and In column 10 at line 3 delete "maintining" and insert --maintaining--.

Signed and Sealed this

Ninth Day of June, 1992

Attest:

DOUGLAS B. COMER

*Attesting Officer*  *Acting Commissioner of Patents and Trademarks*